(12) United States Patent
Chen et al.

(10) Patent No.: US 6,384,575 B1
(45) Date of Patent: May 7, 2002

(54) BATTERY CHARGER CAPABLE OF CHARGING DIFFERENT SIZE OF BATTERIES

(75) Inventors: Chen Chun Chen; Hsu Wen Kuan, both of Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 0 days.

(21) Appl. No.: 09/824,464

(22) Filed: Apr. 2, 2001

(30) Foreign Application Priority Data

Nov. 28, 2000 (TW) .......................................... 89125259 A

(51) Int. Cl.[7] .................................................. H02J 7/00
(52) U.S. Cl. ...................................................... 320/110
(58) Field of Search .................................. 320/106, 110

(56) References Cited

U.S. PATENT DOCUMENTS

| | | | | |
|---|---|---|---|---|
| 5,057,761 A | * | 10/1991 | Felegyhazi, Sr. | 320/110 |
| 5,686,811 A | * | 11/1997 | Bushong et al. | 320/110 |
| 6,014,010 A | * | 1/2000 | Yao | 320/107 |

* cited by examiner

Primary Examiner—Gregory Toatley
(74) Attorney, Agent, or Firm—Volpe and Koenig, P.C.

(57) ABSTRACT

A battery charger capable of simultaneously charging at least one battery of different size is provided. The battery charger includes an upper housing, a lower housing, and at least one charging unit. The charging unit includes a battery receptacle, a switching device and a contact element. The switching device is positioned in one side of the battery receptacle and the contact element is positioned in the other side of the battery receptacle. When the switching device is switched to a first position, a first size battery would be charged and when the switching device is switched to a second position, the second size battery would be charged.

9 Claims, 8 Drawing Sheets

BATTERY CHARGER CAPABLE OF CHARGING DIFFERENT SIZE OF BATTERIES

FIELD OF THE INVENTION

The present invention relates to a battery charger, and more particularly to a battery charger capable of charging different size of batteries.

BACKGROUND OF THE INVENTION

Many products, for example a calculator, a clock, a pager, a Walkman, an electric razor, a flashlight, a camera, etc., are widely used and operated by one or more batteries because they are portable and convenient power source. In order to reduce cost of the batteries and be environmentally friendly, a rechargeable battery is successfully developed. There are many types of commercially available batteries such as Nickel-Cadmium (Ni—Cd) batteries, Nickel Metal Hydride batteries, Lead Acid batteries and Lithium Ion batteries.

The standard size of battery usually has been designated as AAA, AA, C, and D. In response to the marketplace's demand, a battery charger has been developed to simultaneously charge batteries. Such battery charger has a plurality of charging units having predetermined sizes of battery receptacles for receiving specific batteries. For example, if four batteries of size AA or AAA are going to be simultaneously charged, five battery chargers having four charging units (i.e. four AAAs, three AAAs and one AA, two AAAs and two AAs, one AAA and three AAs, and four AAAs) would be manufactured, which is costly and not environmentally friendly. Furthermore, fabricating more battery chargers is necessary when more sizes of batteries and more of different sizes are designed for receiving specific batteries, which is not pleasing to the eye.

A battery charger has been developed to overcome the above drawbacks. FIGS. 1(a) and 1(b) show a typical battery charger capable of charging two standard batteries, e.g. AAA size and AA size, by using springs to expand and contract the length of battery receptacles. The battery charger includes a main body 11 having four sets of charging units, wherein each set of charging unit includes a battery receptacle 12, a contact element 13, an adjusting plate 14 and a slot 15. The adjusting plate 14 is connected to a spring 16 under the battery receptacle 12 and as another contact element. The anode and cathode of a battery to be charged are engaged and electrically connected with the contact element 13 and the adjusting plate 14. In normal condition, the adjusting plate 14 is positioned in one side of the battery receptacle 12 by a pulling force resulted from the spring 16. If the adjusting plate 14 is pulled in the direction distant from the positive electrode contact 13 via the slot 15, the charging unit is capable of charging an AA size battery. Although such charger could simultaneously charge different size batteries, it has the following disadvantages:

(1) The pulling force by the spring 16 needs to be large enough to pull the adjusting plate 14 when an AA size battery is charged, which is inconvenient; and (2) The elastic fatigue of the spring 15 is common; therefore, the electric engagement of the charging unit could not be achieved.

Therefore, the present invention provides an improved battery charger for overcoming the problems described above.

SUMMARY OF THE INVENTION

It is an object of the present invention to provide a battery charger capable of charging a battery selected from one of a first size battery and a second size battery.

It is another object of the present invention to provide a battery charger capable of simultaneously charging different size batteries.

In accordance with one aspect of the present invention, the battery charger includes a housing and at least one charging unit. Each of the charging unit includes a battery receptacle disposed on the housing for receiving and supporting a battery selected from one of a first size battery and a second size battery, a switching device positioned in one side of the battery receptacle and has a metal strip thereon, and a contact element positioned in the other side of the battery receptacle. The first size battery would be charged when the switching device is switched to a first position and the second size battery would be charged when the switching device is switched to a second position.

Preferably, the housing includes an upper housing, a lower housing.

In accordance with another aspect of the present invention, the anode and cathode of the battery are respectively electrically connected with the metal strip and the contact element. Furthermore, the metal strip includes a first protruding pad corresponding to the first size battery and a second protruding pad corresponding to the second size battery. The switching device further includes a protuberance for facilitating adjusting the switching device by hand.

Preferably, the battery receptacle is a concave recess having multiple supporting surfaces.

Preferably, each of the first size battery and the second size battery is selected from a group consisting of size AAA battery, size AA battery, size C battery and size D battery.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
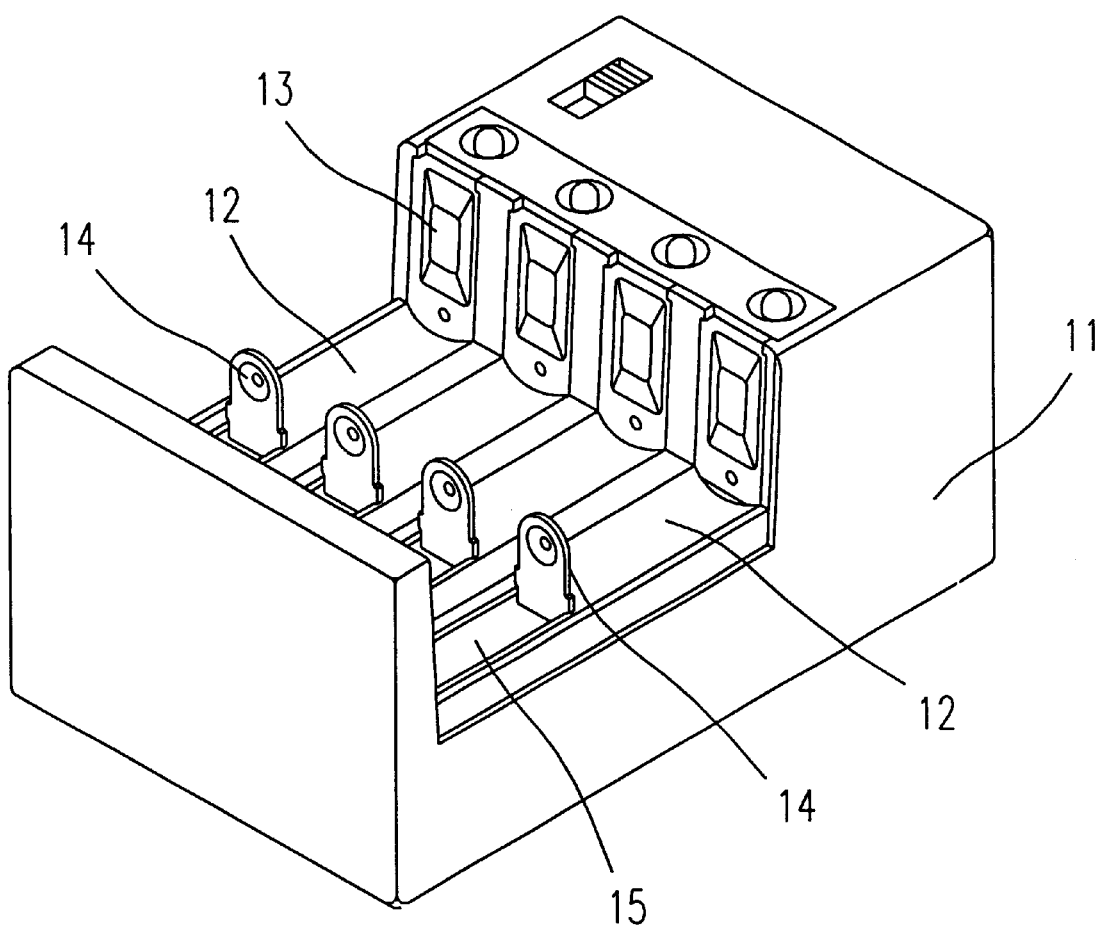
FIG. 1(a) is a perspective view showing a battery charger capable of charging two standard batteries according to prior art, wherein the receptacles could receive AAA batteries.
Figure 1B:
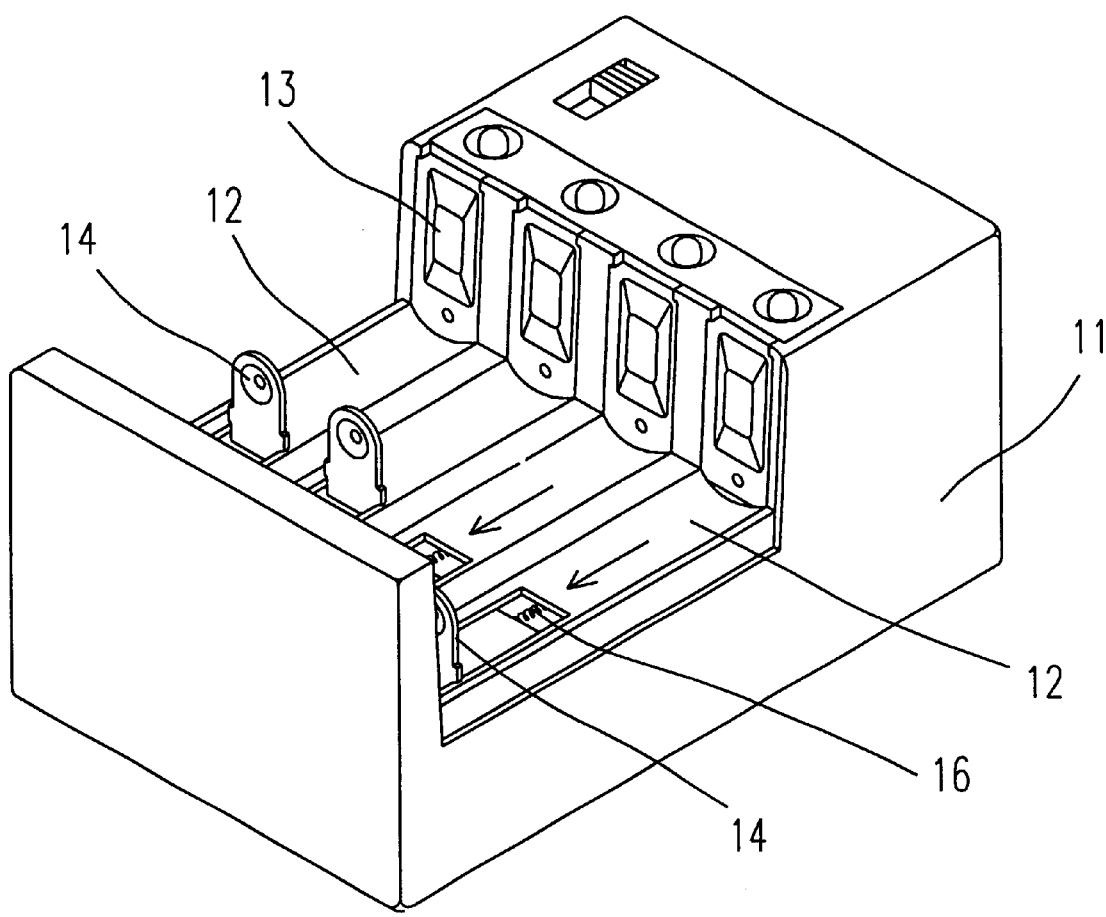
FIG. 1(b) is a perspective view showing a battery charger capable of charging two standard batteries according to prior art, wherein portions of the adjusting plates are adjusted to receive AA Batteries.
Figure 2:
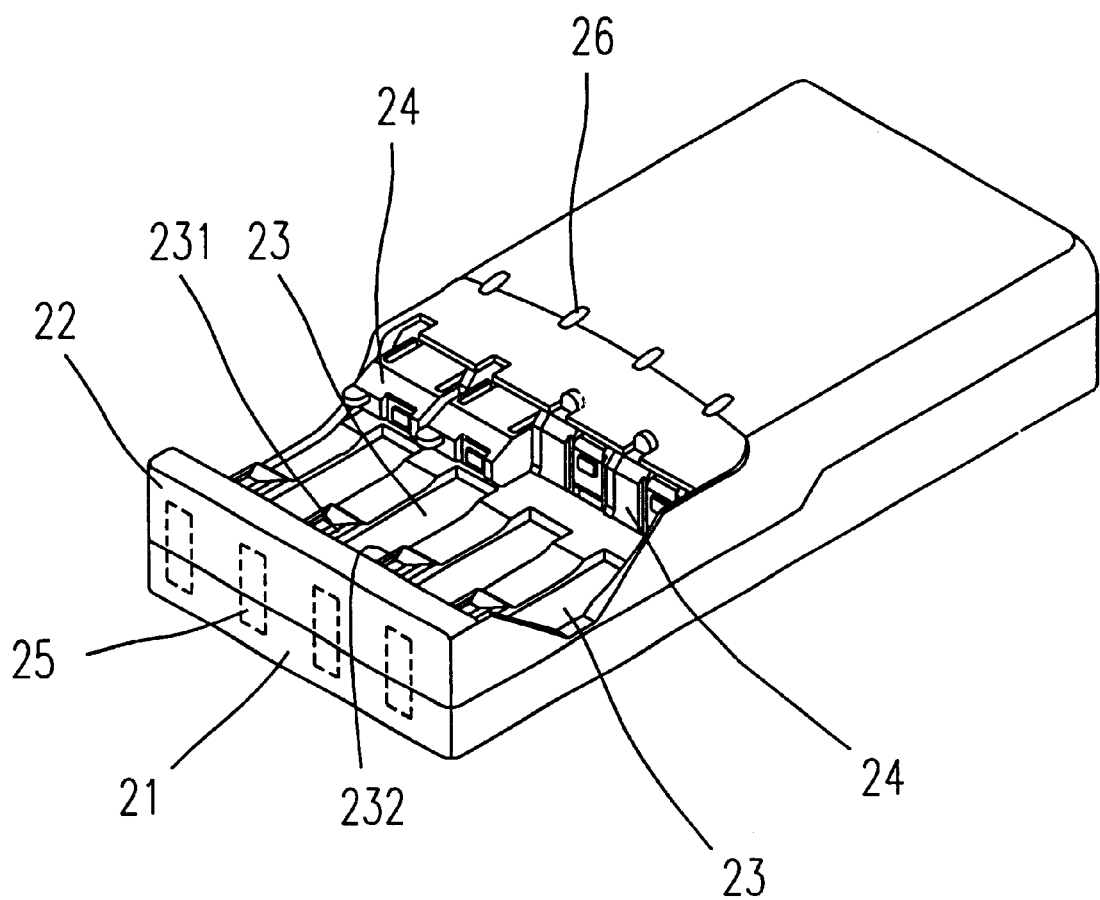
FIG. 2 is a perspective view showing a battery charger according to a preferred embodiment of the present invention.
Figure 3:
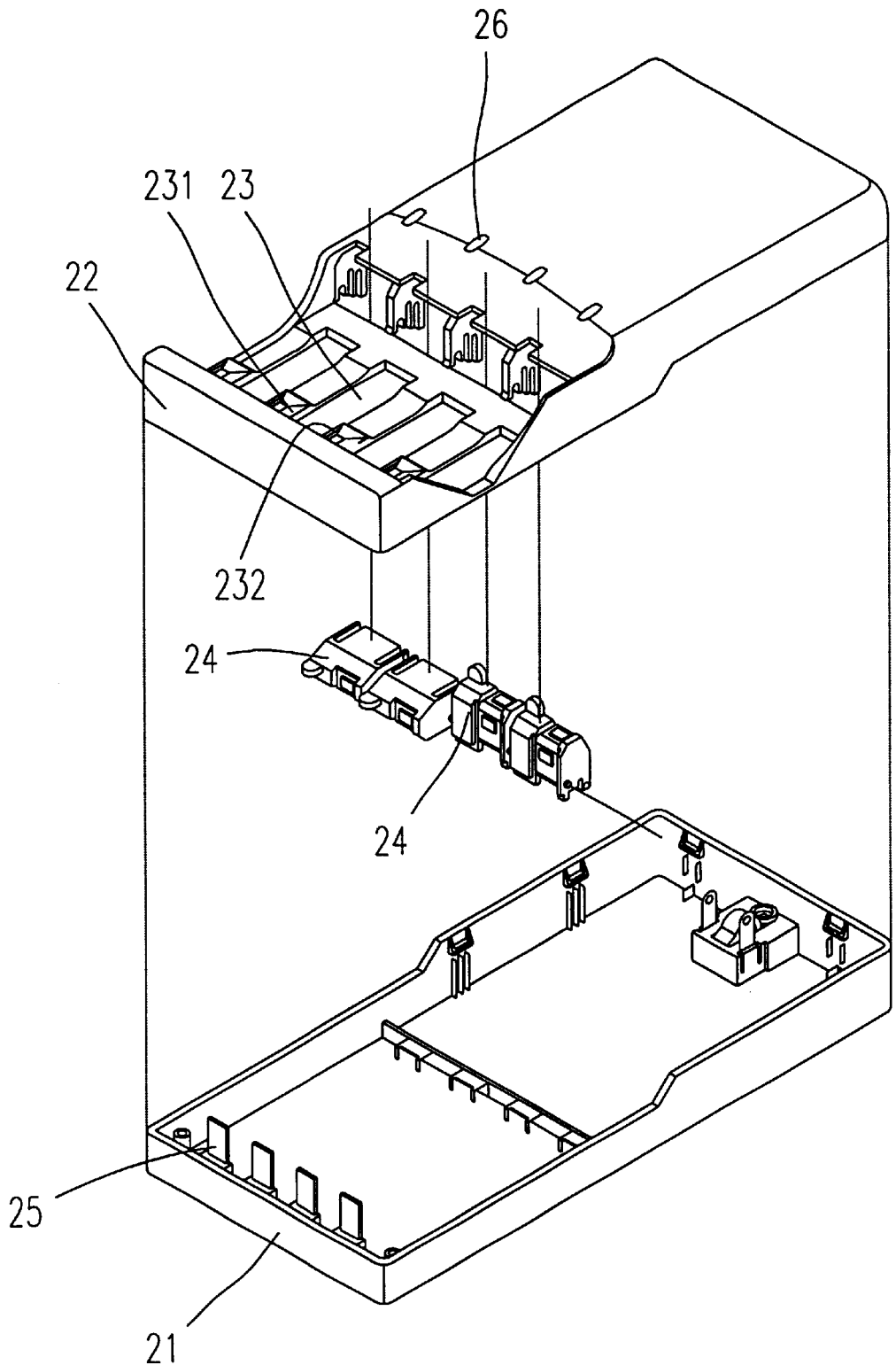
FIG. 3 is a view showing the assembly of the battery charger in FIG. 2.

Please refer to FIGS. 2 and 3. The structure of the charger according to the preferred embodiment of the present invention principally includes a lower housing 21, an upper housing 22, four sets of charging units and an indicating light 26. The lower housing 21 and the upper housing are plastic molded. Each set of charging unit includes a battery receptacle 23, a switching device 24 and a contact element 25. The battery receptacle 23 is designed to receive one AAA or AA battery by switching the switching device 24. In order to receive and support the battery thereon, the battery receptacle 23 is configured to be in a shape of concave recess having a first surface 231 and a second surface 232. Preferably, the first surface 231 and the second surface 232 are curved surfaces, and more preferably, multiple curved surfaces.

Figure 4:
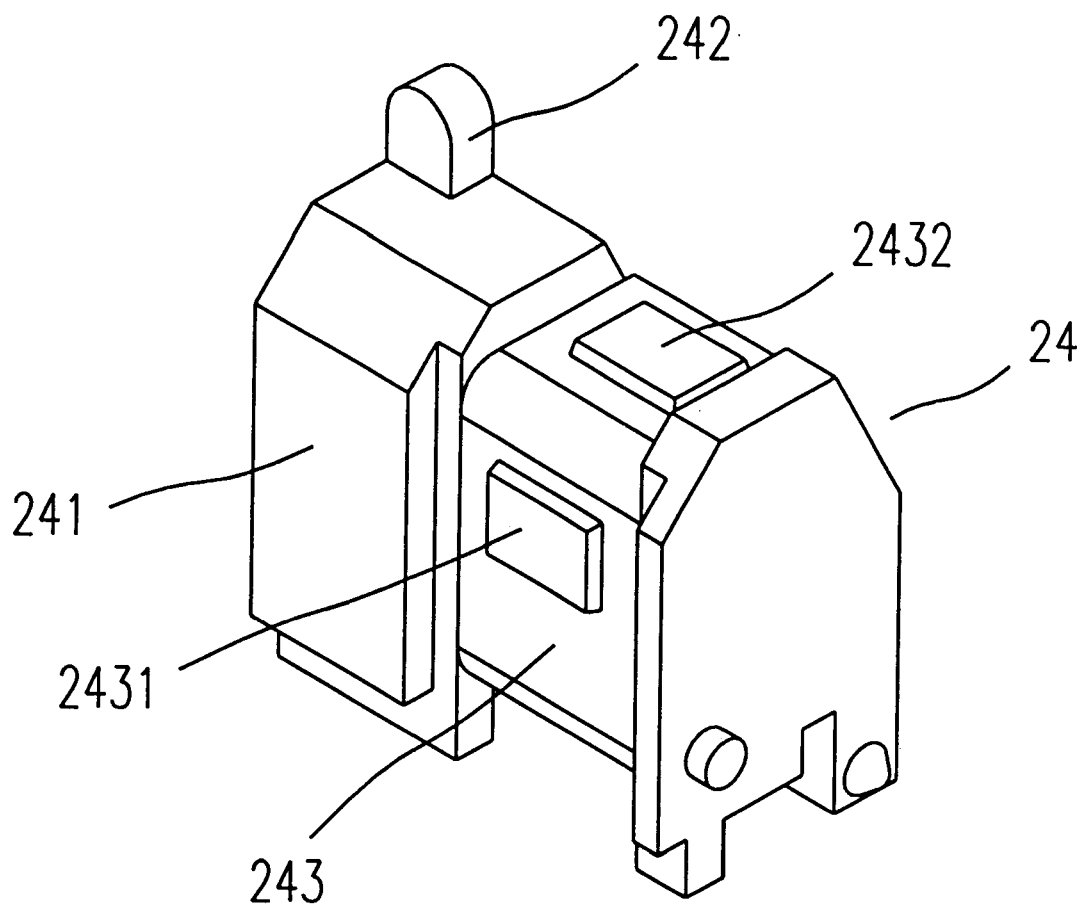
FIG. 4 is a perspective view showing the switching device of the battery charger in FIG. 2.
Figure 5:
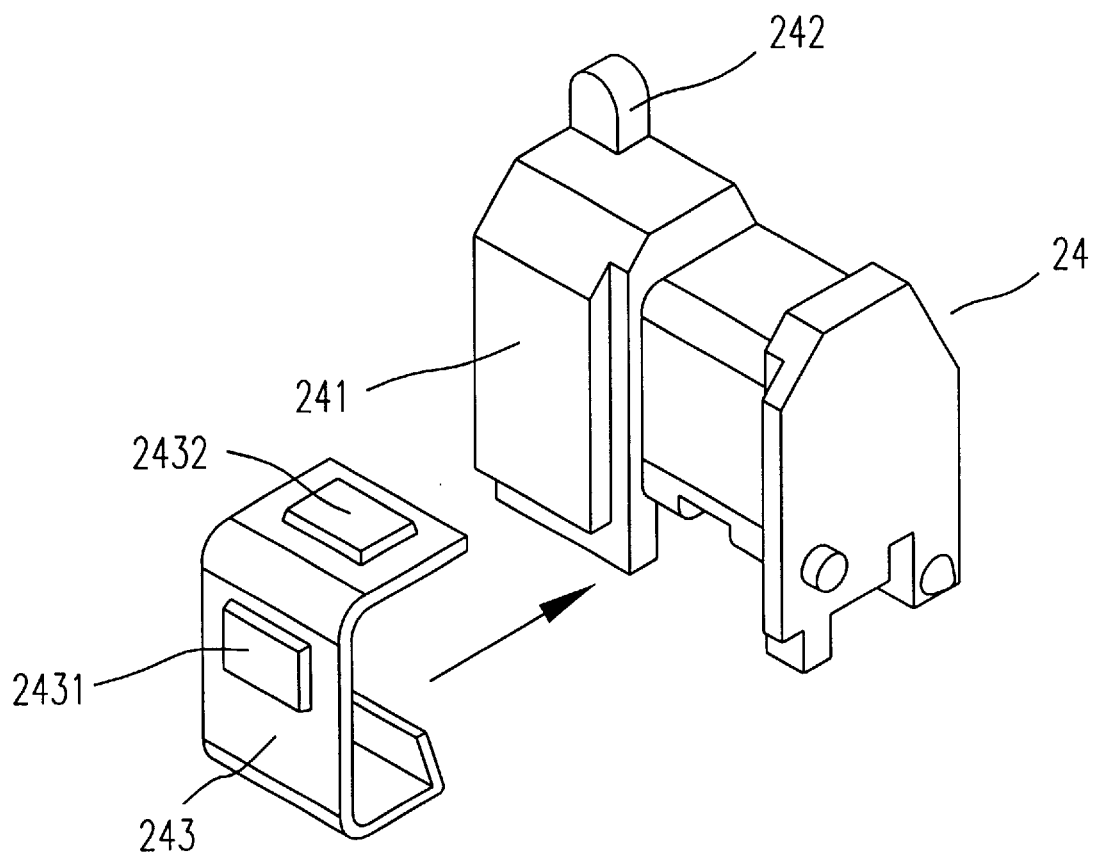
FIG. 5 is a view showing the assembly of the switching device in FIG. 4.

FIGS. 4 and 5 are respectively perspective and exploded views of the switching device 24 of the present invention. The switching device 24 includes a molded plastic main body 241, a protuberance 242 for facilitating adjusting the switching device 24 and a metal strip 243 on the main body 241. The metal strip 243 further includes a first protruding pad 2431 and a second protruding pad 2432. When the switching device 24 is switched to the first position, the battery receptacle 23 is capable of receiving an AA battery and the electrical engagement of the anode and cathode of the AA battery with the first protruding pad 2431 and the contact element 25 is also performed. On the other hand, when the switching device 242 is switched to the second position, the battery receiving portion 23 is capable of receiving an AAA battery and the electrical engagement of the anode and cathode of the AAA battery with the second first protruding pad 2432 and the contact element 25 is performed. Certainly, the dimensions of the receptacle 23 and the switching device 24 can be predetermined to receive other standard size batteries, such as size C battery and size D battery.

As foregoing description, five chargers are possible to be produced to charge four batteries of two sizes in the prior art. However, only one charger is needed to achieve the above object in the present invention. Thus, the battery charger according to the present invention is less cost and more environmentally friendly. Furthermore, the battery charger according to the present invention doesn't require the spring so as to avoid the drawback of elastic fatigue thereof.

Figure 6A:
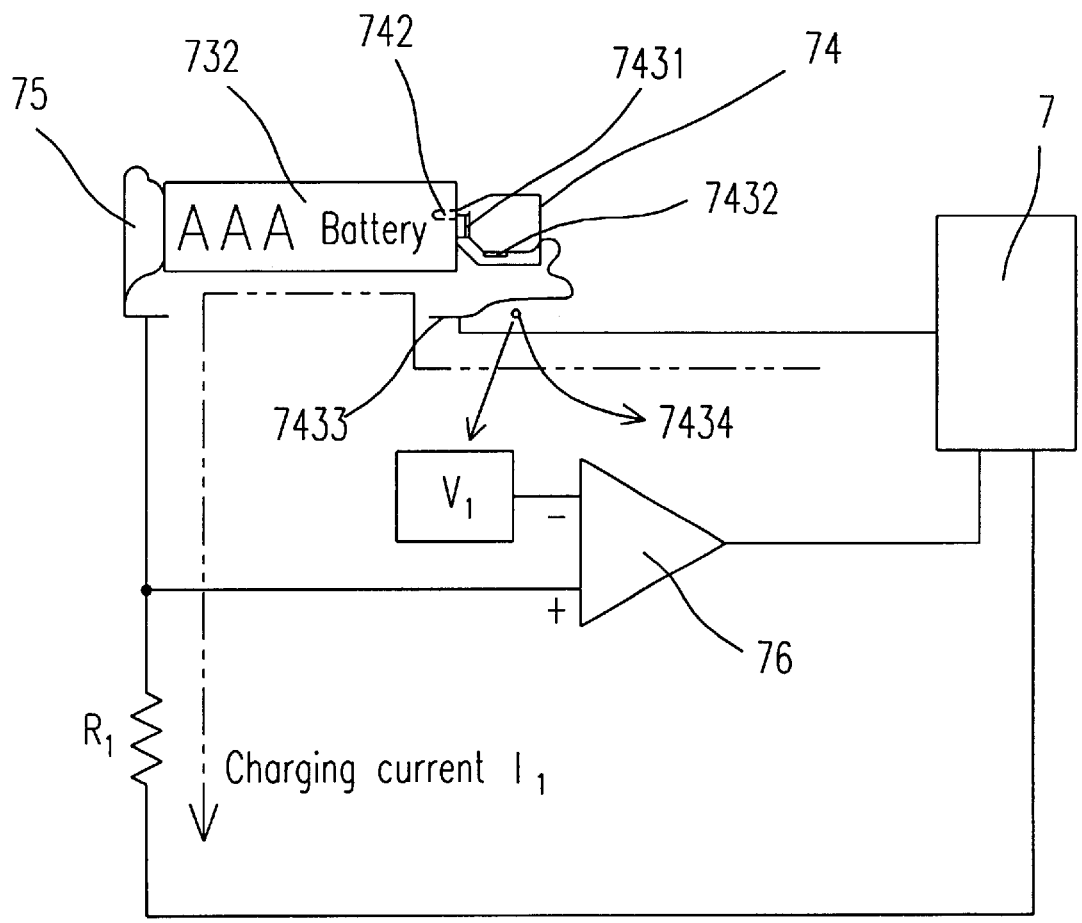
FIG. 6(a) is a sectional view showing a first charging circuit according to a preferred embodiment of the present invention.
Figure 6B:
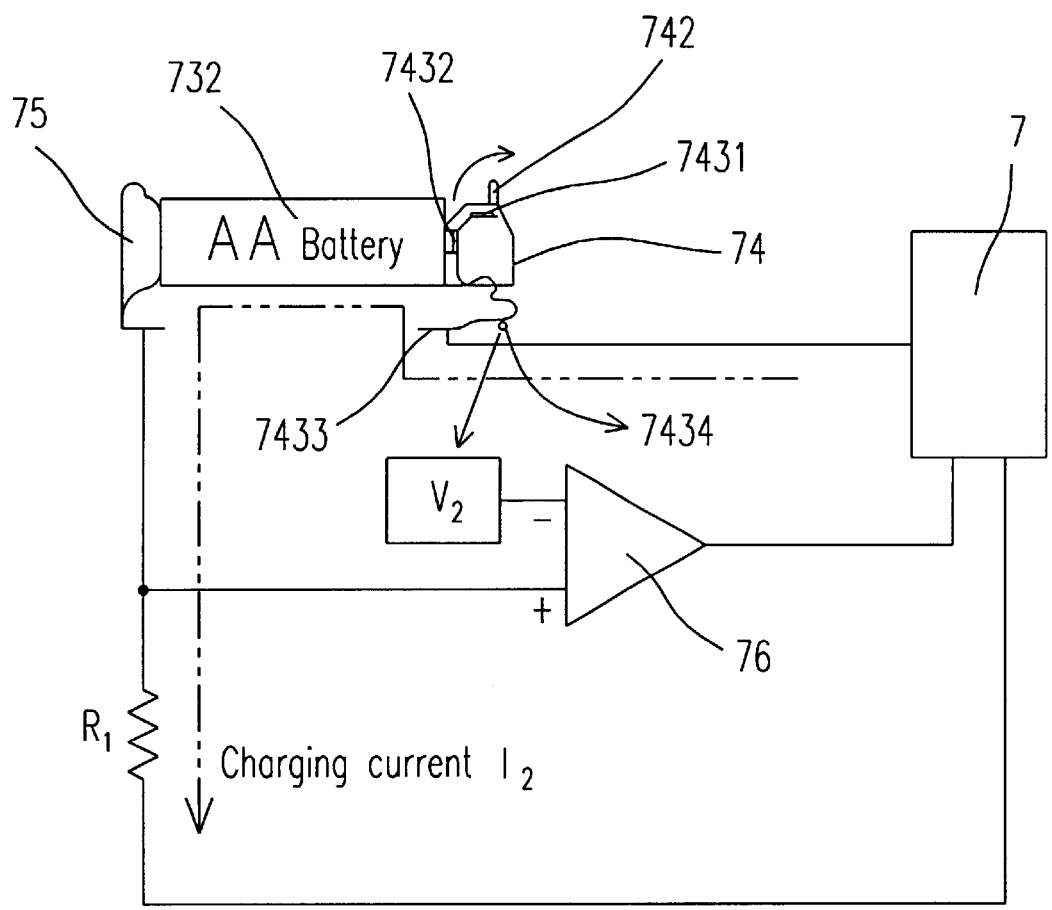
FIG. 6(b) is a sectional view showing a second charging circuit according to a preferred embodiment of the present invention.

FIGS. 6(a) and (b) illustrate the charging circuits of the battery charger according to the preferred embodiment of the present invention. Referring to FIG. 6(a), the first charging circuit includes a switching device 74, a contact element 75, a resistor R1 and a comparator 76. The resistor R1 and the comparator 76 are positioned on a circuit board (not shown). The switching device 74 is electrically connected to the circuit board. In this first charging circuit, the switching device 74 is switched to engage an AAA battery supported in the battery receptacle 75 of the battery charger. When a power source 7 outside the battery charger is applied, the battery charger starts to charge the AAA battery. Meanwhile, a first charging current I1 passes through the first charging circuit. When the result of I1 multiples R1 is equal to a predetermined first reference voltage V1, the comparator 76 delivers a voltage signal to a control circuit (not shown) on the circuit board to stop charging after a predetermined period. Referring to FIG. 6(b), the second charging circuit includes a switching device 74, a contact element 75, a resistor R2 and a comparator 76. The resistor R2 and the comparator 76 are positioned on a circuit board (not shown). The switching device 74 is electrically connected to the circuit board. In this first charging circuit, the switching device 74 is switched to engage an AA battery supported in the battery receptacle 75 of the battery charger. When a power source 7 outside the battery charger is applied, the battery charger starts to charge the AA battery. Meanwhile, a first charging current I2 passes through the first charging circuit. When the result of I2 multiples R2 is equal to a predetermined first reference voltage V2, the comparator 76 delivers a voltage signal to a control circuit (not shown) on the circuit board to stop charging after a predetermined period.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. A battery charger having a housing and at least one charging unit, said charging unit comprising:
   a battery receptacle disposed on said housing for receiving and supporting a battery selected from one of a first size battery and a second size battery;
   a switching device positioned in one side of said battery receptacle and having a metal strip thereon; and
   a contact element positioned in the other side of said battery receptacle, wherein said first size battery is charged when said switching device is switched to a first position and said second size battery is charged when said switching device is switched to a second position.

2. The battery charger according to claim 1, wherein said housing comprises an upper housing and a lower housing.

3. The battery charger according to claim 1, wherein the anode and cathode of said battery are respectively electrically connected with said metal strip and said contact element.

4. The battery charger according to claim 3, wherein said metal strip further comprises a first protruding pad corresponding to said first size battery.

5. The battery charger according to claim 3, wherein said metal strip further comprises a second protruding pad corresponding to said second size battery.

6. The battery charger according to claim 1, wherein said switching device further comprises a protuberance for facilitating adjusting said switching device by hand.

7. The battery charger according to claim 1, wherein said battery receptacle is a concave recess having multiple supporting surfaces.

8. The battery charger according to claim 1, wherein each of said first size battery and said second size battery is selected from a group consisting of size AAA battery, size AA battery, size C battery and size D battery.

9. A battery charger having an upper housing, a lower housing and at least one charging unit, said charging unit comprising:
   a battery receptacle disposed on said upper housing for receiving and supporting a battery selected from one of a first size battery and a second size battery;
   a switching device positioned in one side of said battery receptacle and having a metal strip thereon, said metal strip further comprising a first protruding pad corresponding to said first size battery; and
   a contact element positioned in the other side of said battery receptacle, wherein said first size battery is charged when said switching device is switched to a first position and said second size battery is charged when said switching device is switched to a second position.

* * * * *